Feb. 20, 1968 P. D. J. DICKS ET AL 3,369,274
MOULDING MACHINE
Filed Oct. 6, 1965 3 Sheets-Sheet 1

INVENTORS
PETER D. J. DICKS
WILLIAM M. HILL
BY~ *Featherstonhaugh & Co.*
ATTORNEYS

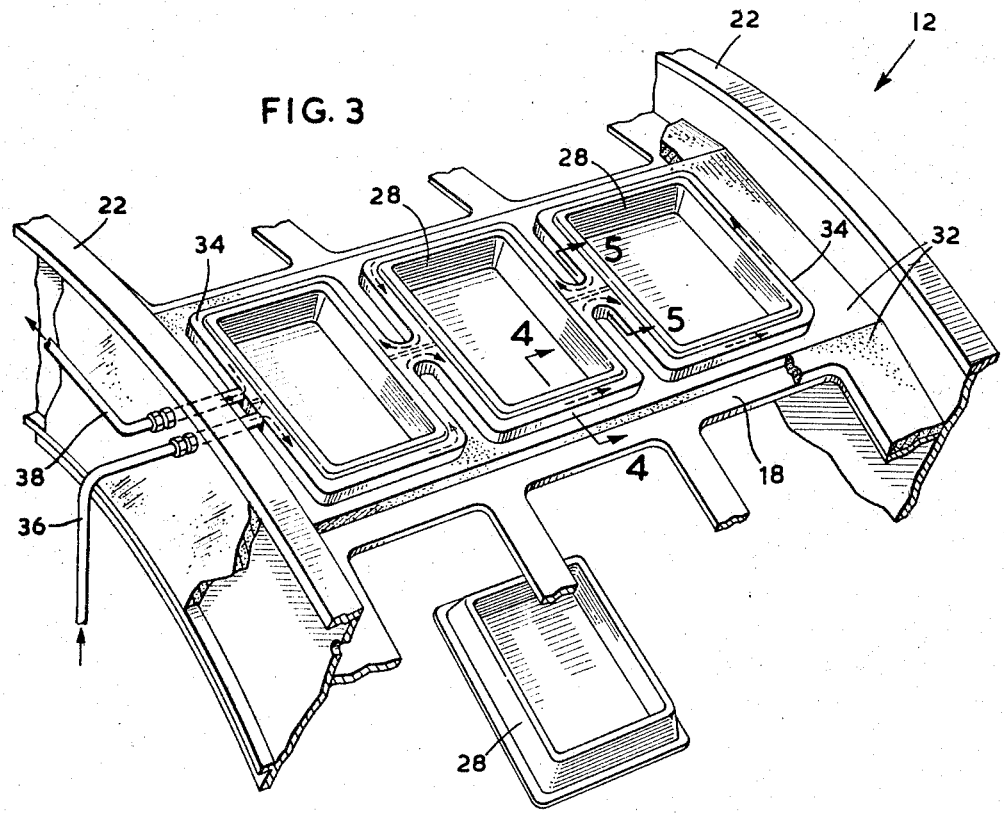
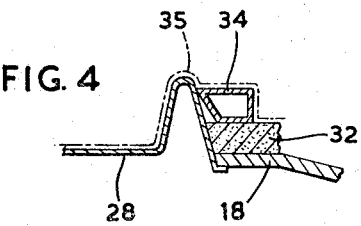
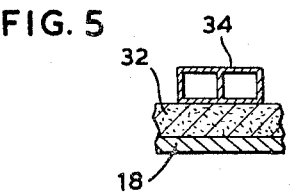

United States Patent Office 3,369,274
Patented Feb. 20, 1968

3,369,274
MOULDING MACHINE
Peter Derek John Dicks, Kitchener, Ontario, and William Melville Hill, Ayr, Ontario, Canada, assignors to Spraymould (Bahamas) Limited, Nassau, Bahamas
Continuation-in-part of application Ser. No. 402,713, Oct. 9, 1964. This application Oct. 6, 1965, Ser. No. 493,335
5 Claims. (Cl. 18—21)

ABSTRACT OF THE DISCLOSURE

The invention is a moulding machine wherein the moulds are mounted on the side wall of a drum and the interior of the drum constitutes a sump for hot liquid whereby moulding material sprayed on to the moulding surface of the moulds on the outside of the drum is cured as heat is transmitted through the mould from the sump to the moulding material. A cooling ring defines the perimeter of the moulding surface of the moulds and has a coolant forced therethrough to prevent the curing of plastic material at the perimeter of the moulding surface so that trimming of the moulded product is unnecessary.

---

This invention relates to apparatus for moulding plastic articles and to a method for moulding articles, and is a continuation-in-part of application Ser. No. 402,713, filed Oct. 9, 1964.

In the manufacture of plastic articles, such as containers and trays, it is common to employ injection moulding techniques and equipment. A major drawback of the injection moulding process is the relatively high capital outlay required to purchase injection moulding machinery and the precision dies required to obtain a high quality product.

It has been found that plastic articles, such as trays and open containers, can be successfully produced by employing an electrostatic powder-spraying process. The electrostatic powder-spraying process can be successfully carried out using normal commercially available plastics which have flow properties that will produce a solid body on curing without pressure, such as polyethylenes, polyamides, and polyvinyl chloride. The capital outlay required to acquire an electrostatic powder-spraying device and moulds for use therewith is substantially less than the comparative cost of an injection die moulding machine and dies therefor to mould similar articles. Moreover the simplicity of the spraying process reduces the maintenance and running costs of the operation to a minimum.

This invention is primarily concerned with apparatus for mounting open dies for use with a powder-spraying device and carrying them into and out of operative relation with respect to the spray head in a continuous fashion. The device provides for the cyclic heating of the dies and a body of plastic coated thereon by the spraying head and the subsequent cooling of the dies and the moulded plastic product prior to separation of the product from the dies. All of the necessary functions to be performed with respect to the die are attended to by the machine in a simple and inexpensive manner. The machine is rugged and has a low initial cost and low maintenance cost.

It is therefore an object of the invention to provide a machine for moulding plastic articles that fulfills the foregoing requirements.

It is a further object of the invention to provide a method for quickly and efficiently manufacturing moulded products.

Generally speaking, a moulding machine according to this invention has a plurality of open moulds, endless conveyor means for said moulds having an inside and an outside, means supporting said moulds in series on said conveyor means with their moulding surfaces on the outside thereof, means for operating said conveyor to cyclically carry said moulds around a path, plastic applying means for applying a coating of particles of plastic material to the moulding surfaces of said moulds as they pass a predetermined point on said path, curing means adapted to retain and present a hot liquid at the inside of said conveyor to achieve heat transfer relationship with said moulds from their backs and cure plastic material applied by said plastic applying means, cooling means for cooling said moulds at a point on said path subsequent to said curing means, and parting means for parting plastic articles in said mould cavities from said moulds at a point subsequent to said cooling means.

The method of the invention consists essentially of moulding plastic containers from an insulating plastic material that will accept an electrostatic charge and that can be cured as a body in powdered form by the application of heat without pressure, and comprises the steps of forming a mould having a front side with a cavity that is adapted to attract an electrostatically charged particle with a contour of the container to be moulded. The mould has a back side remote from the front side and heat is applied to the mould to heat it to above curing temperature of the plastic to be used by carrying the back side of the mould into heat transfer relation with a body of heated liquid. The plastic material is coated onto the cavity of the mould by electrostatically charging particles of the plastic material and releasing them in the region of the mould cavity. As the back side of the mould is carried out of heat transfer relation with the body of heated liquid, the body of plastic material is cooled and removed from the mould cavity.

The invention will be clearly understood after reference to the following detailed specification read in conjunction with the drawings.

Figure 1:
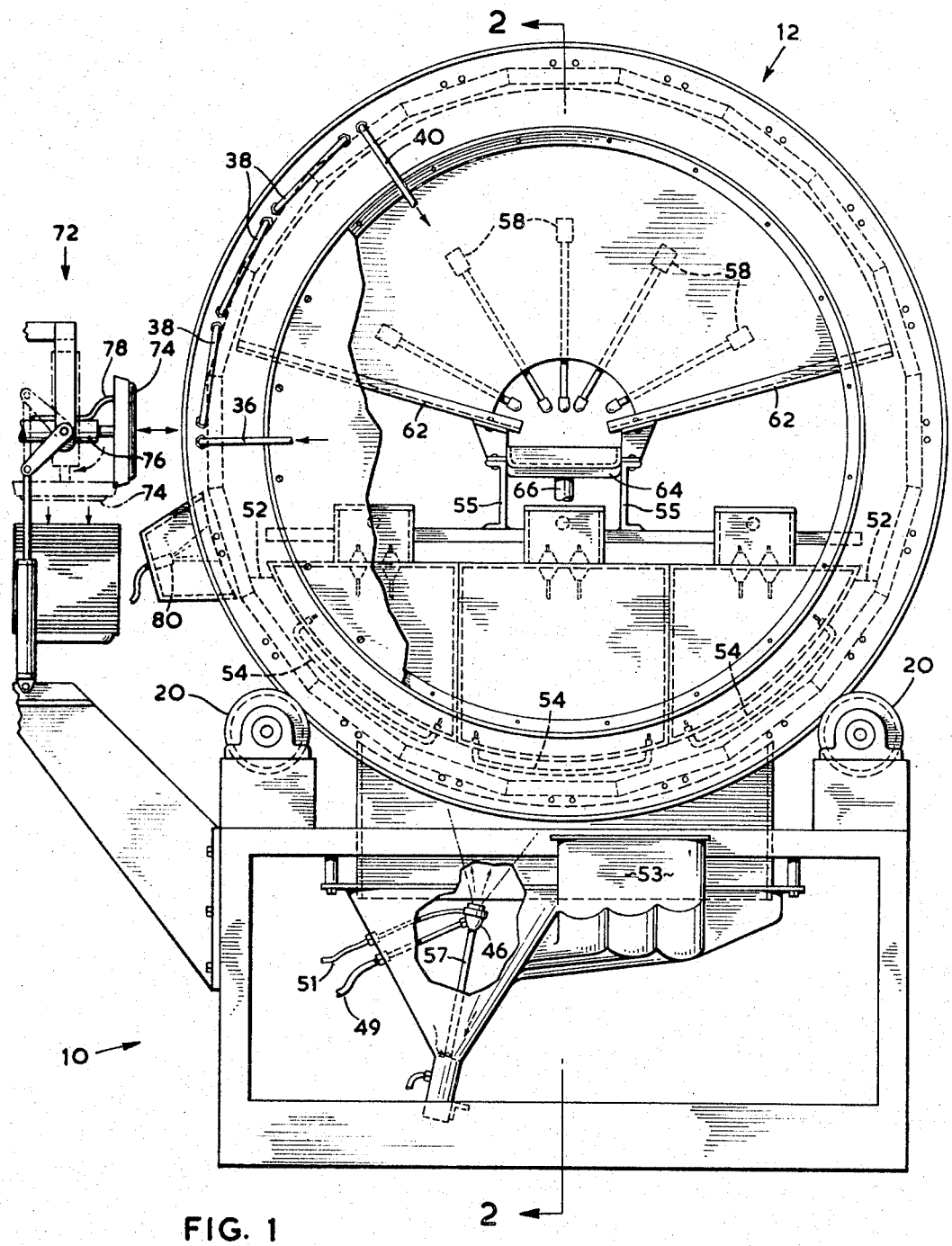
FIGURE 1 is a side view of a moulding apparatus according to this invention.
Figure 2:
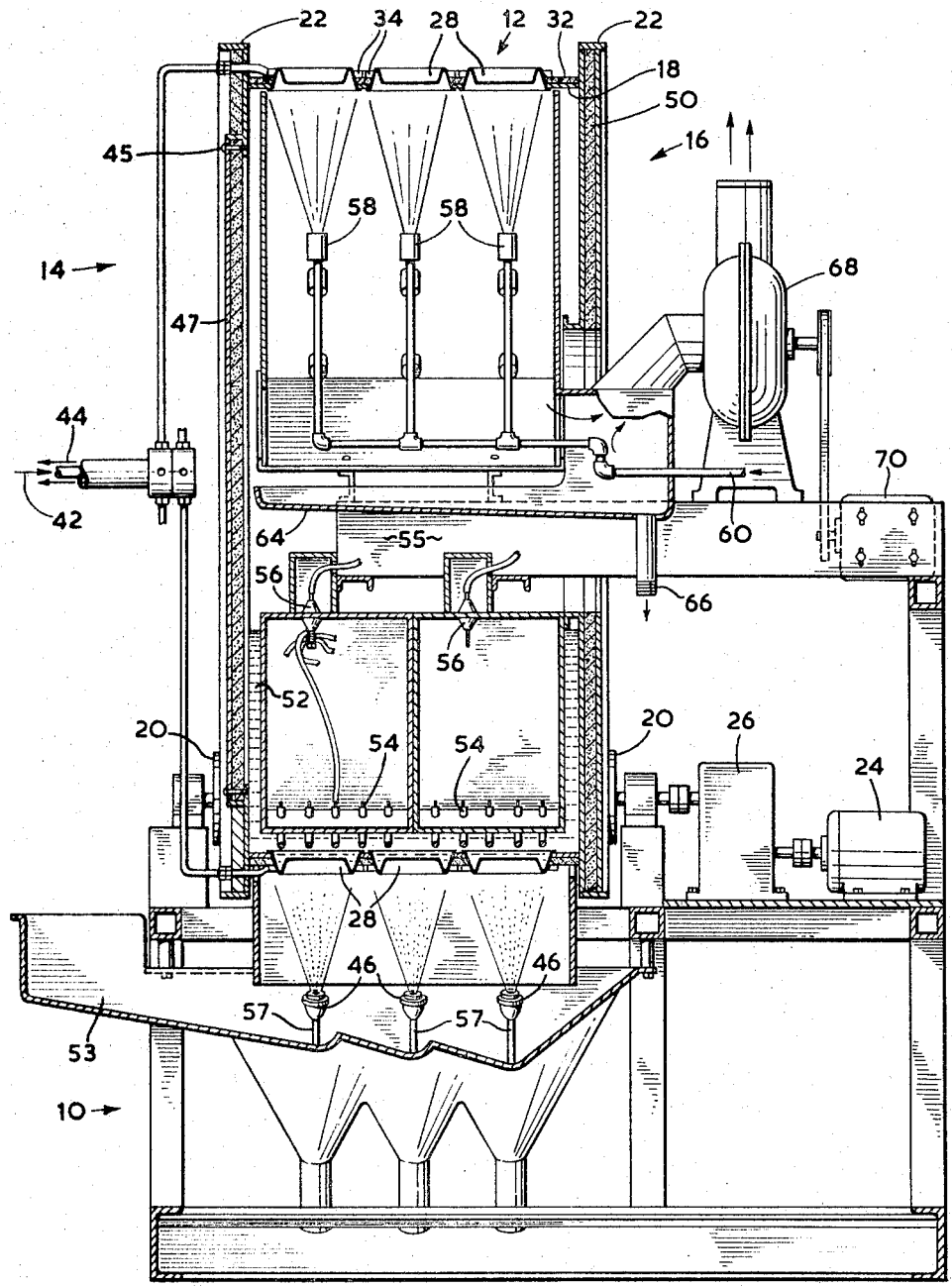
FIGURE 2 is a view along the line 2—2 of FIGURE 1.

FIGURE 3 is a fragmentary perspective view of a portion of the drum surface; and FIGURES 4 and 5 are sectional views along the lines 4—4 and 5—5 respectively.

The machine illustrated in the drawings has a basic frame, generally indicated by the numeral 10, upon which is mounted the various cooperating parts. Principal among the cooperating parts is the drum, generally indicated by the numeral 12. It has opposed end walls, generally indicated by the numerals 14 and 16, and a side wall 18 and is rotatably mounted with respect to the frame 10 by means of four rollers 20 which engage with the opposed rims 22. Rollers 20 are journalled in the frame 10 and are spaced to cradle the drum therebetween so that it can rotate about a substantially horizontal axis that extends through the side walls 14 and 16. The rollers 20 are formed with grooves to accommodate the rims 22 of the drum and prevent lateral movement of the drum.

A motor 24 provides rotational power to one of the rollers 20 through the transmission 26 to rotate the drum 12. Thus, by operating the motor 24, drum 12 can be rotated as required and as will be referred to later.

As indicated above, the invention relates to plastic moulding and for this purpose there is provided a series of open cavity moulds 28 arranged three across and extending entirely around the side wall 18 of the drum 12. Moulds 28 are preferably copper/nickel or nickel electroformed moulds having a wall thickness of about .025 inch. They are brazed to the steel side wall 18 of the drum 12.

The appaartus employs the electrostatic powder-spraying technique for applying the plastic, and to this end the mould cavity must be adapted to attract an electrostatically charged particle of plastic material. The moulds are therefore electrically grounded by grounding the metal drum in which they are mounted.

The electrostatic powder-spraying technique also requires that the area adjacent the article being coated be not adapted to accept an electrostatically charged particle and/or that it be kept at a temperature less than the curing temperature for the plastic, and for this requirement the surface of the side wall 18 of the drum 12 has an overlay of an asbestos type insulator 32. The asbestos is a heat insulator and prevents excessive heat loss through the side walls of the drum and prevents the outside of the drum, apart from the moulds, from attaining a curing temperature.

The fragmentary perspective view (FIGURE 3) and the sections (FIGURES 4 and 5) show the mould construction and end wall mounting. An unmounted mould has been illustrated at the lower part of FIGURE 3.

It will be noted that each of the moulds 28 has a cooling tube 34 that extends around its perimeter. It will also be noted that the cooling tube 34 is in heat insulating relation to the mould cavity beyond the perimeter, an effect that is achieved by forming the perimeter of the mould as an inverted U and having the cooling tube contact the outer arm of the U along a line only as seen in FIGURE 4. Cooling tube 34 continuously carries a liquid coolant such as water in use and keeps the edge of the body of plastic sprayed into the mould cavity cool at all times so that when the article is parted from the mould it has a clean edge that does not require trimming. On the other hand, it is not desired that the cooling should extend beyond the perimeter, otherwise there would be an undesirably large portion of the plastic not properly cured at the edge.

In the spraying operation powder will be attracted to the mould and to the metallic tube 34 in a layer, as indicated at 35 in FIGURE 4. Water flowing through the tube at about room temperature prevents the plastic adjacent the tube from curing as the unit is subjected to heat treatment, with the result that when the cured moulded product is released from the mould, it parts with a sharp, well defined edge at the tube which does not require trimming.

A typical tube 34 connects with an inlet tube 36 and extends first around the perimeter of the lower half of each of the moulds 28 across the end 18 of drum 12, and then back across the oppoed half of each of the moulds 28 to an interconnecting conduit 38. Interconnecting conduit 38 connects at its other end (not shown in FIGURE 3) with another tube 34 that extends across and back the next bank of moulds 28 in a similar way to that illustrated in FIGURE 3. Four banks of moulds are connected in series in this way, and the conduit return from the fourth bank is connected to a radially extending outlet conduit such as the one 40. The inlets 36 and outlets 40 connect with a cold water supply 42 and a drain 44 respectively at the centre of rotation of the drum. Connection of the lines 36 and 40 to supply 42 and drain 44 permits rotation of the drum lines 36 and 40 with respect to the supply and drain. There are in all twenty banks of transversely extending moulds 28 supplied by five inlets 36 and outlets 40, all of which connect with the concentrically arranged supply 42 and drain 44. Water at about room temperature can be supplied through the pipes at a sufficient flow rate to prevent curing of the plastic on the tube and assure a clean line of demarcation between the cured and uncured plastic.

Plastic in powder form is sprayed onto the open cavities of the moulds 28, as the drum 12 is rotated past the spray heads 46 of an electrostatic powder-spraying unit. Each charging head has an air line 49 to create an appropriate swirling action to ensure correct charging of powder and correct cloud formation. Numeral 51 refers to a 90,000 volt potential supply for charging the plastic. The plastic powder is contained in a hopper 53, which is flexibly mounted on soft rubber bushes and freely vibrated by a vibrator (not shown). The plastic passes from the hopper through the fluidizing tube 57 to the heads 46. Fluidizing tube 57 passes pressurized air required to fluidize the powder and pass the fluidized powder up the tube to the charging head 46.

These spray units per se are not new and a good account of their operation is to be found at page 223 of the May 1962, volume 2, Number 5, Edition of International Plastics Engineering, published by Iliffe Industrial Publications Limited, London, England. In the process the electrostatically charged plastic particles are attracted to and adhere to the mould and form a plastic layer. These particles must be heated to fuse the layer and cure it.

The maner of heating the particle layer is a feature of this invention. It will be noted that the end wall 14 comprises a cover plate 47 of heat insulating asbestos covered with metal bolted around its marginal edge portion to the rim area as at 45. The end wall 16 comprises an annular asbestos and metal plate 50 similarly mounted but having a hole in its centre to permit entry of operating parts to the interior of the drum, as will be referred to later. The lower interior portion of the drum constitutes a sump for a hot salt liquid 52, which in use is heated to a temperature of about 670° F. by the banks of electrical heaters 54.

The heaters are arranged in six banks 54, there being two banks across the drum and three banks around the drum. They are rigidly mounted with respect to the frame, and the framework 55, from which they are suspended, enters through the hole in panel 50. Each bank 54 consists of ten separate elements, each of which has a capacity of 600 watts. Electricity is supplied to each bank through the terminals 56 from the exterior of the drum. Power supply is through the central opening in panel 50 of side wall 16, and switching arrangements for connecting some or all heaters are preferably provided. Switching arrangements for the heater are capable of considerable variation and will be apparent to those skilled in the art. Detail is therefore not illustrated.

Any high temperature liquid can be used in the sump. We use low melting point drawing salts, which become liquid at about 275° F. and can be heated beyond that temperature. Temperatures of between 400° F. and 700° F. are commonly used.

The moulds 28 are of thin metal and in good heat transfer relation with the interior of the drum. Therefore, the heat of the heated salt solution in the sump is quickly transferred to the moulds. They are thus quickly heated to the temperature of the liquid 52 when they come into contact with the hot liquid in the sump, and in this heated state they quickly fuse and cure the plastic particles sprayed onto them.

As the moulds pass beyond the sump of heated liquid 52 and leave heat transfer relation with the interior of the drum at the sump, the layer of plastic particles sprayed by the gun 46 is fused and cured but still hot. It must be cooled to loosen the moulded article formed on the mould cavity in preparation for parting from the mould. This is done by the cooling means rigidly mounted in the upper interior portion of the drum, which consists of five transversely extending rows of three water spray heads 58 adapted to spray an atomized water spray on the inside surfaces of the molds 28 as they pass by. Water is supplied to the heads 58 through the side of the drum by pipe 60. A valve controls the amount of water sprayed, which may vary with product, water temperature and speed of rotation of the moulds. Baffles 62 underlie the spray heads 58 to catch the falling spray water and direct it through the drainage pan 64 out of the drum to drain 66. The moulds are cooled to about 200° F. by these heads.

Numeral 68 is a blower operated by motor 70 designed to remove steam from inside the drum.

The cooling water spray is adapted to loosen the moulded articles from the moulds. Following this, the moulds with their moulded articles move to an ejector, generally indicated by the numeral 72, which engages with the articles, parts them from their moulds and ejects them to a stack. The ejection mechanism is a vacuum pick-up device and capable of great variation and is of a well known nature. It essentially consists of a bank of three floating silicone rubber suction pads 74, each adapted to move forward under the influence of its associated air cylinder 76 to engage with a passing moulded article. Vacuum is then applied through line 78 to the suction pads 74 and the air cylinders 76 are reversed to remove the bank of moulded articles from their moulds. The ejection mechanism is then caused to turn through 90° to cause the suction pads 74 to assume the dotted line position, vacuum is released and the moulded article is blown by air pressure from the suction pad 74 to an underlying stacking table. The ejection system then moves back to original position to engage the next bank of moulds which have moulded articles in them. Detail of the ejection system is not included since the ejection system per se does not form a part of this invention. Removal could be done by alternative ejection systems or even by hand. The invention relates to the drum and its heating and cooling at the interior in relation to the plastic spraying and curing process.

It will be noted that the moulds 28 are sprayed with a liquid release agent by spray heads 80. Spray heads are mounted in the path of the rotating moulds and spray a standard silicone release agent on the moulds after they have been stripped of their moulded articles but before they are heated by entering close heat transfer relation with the sump of heated salt liquid 52.

In use, one prepares the machine by heating the salt 52 in the drum sump to a temperature of about 600° F. and starting the flow of cooling water through the peripheral cooling tubes 34. The drum 12 is then rotated at about 1 r.p.m. in a counterclockwise direction, as seen in FIGURE 1, by means of motor 24 and gear train 26 to carry the moulds 28 in a circular path past the various stations. The flow of cooling water through spray heads 58 is initiated and the empty moulds 28 are sprayed with a standard silicone agent by heads 80. As they proceed in their counterclockwise path, they are heated to about 600° F., the temperature of the salt solution 52 in the sump of the drum, as they enter into heat transfer relation with the body of heated liquid. After initial heating, the moulds pass the plastic spray heads 46 which are operated to coat them with a layer of electrostatically charged polyethylene particles of plastic. In this connection, the moulds are metallic, as noted above, and grounded so that they are adapted to attract the electrostatically charged particles in accordance with electrostatic powder-spraying practice. Other moulding materials of course can be used.

The layer of plastic material so sprayed is fused and cured by the heat of the liquid 52. It will be noted that the area 18 of the side of the drum not covered by a mould 28 is covered with an asbestos material which is an electrical insulating material and will not attract electrostatically charged particles of plastic from the heads 46. Thus, plastic material is only coated on the moulds. It also is a heat insulator and any plastic particles that do land there or on the peripheral tube 34 are not cured.

After the moulded articles move out of heat transfer relation with the hot liquid 52 in the sump, they move into heat transfer relation with the top portion of the drum, where they are impinged on their undersides with a spray of cooling water from the heads 58 adapted to cool them to about 200° F. The body of plastic is cured and formed into a moulded article; it is still hot and the sudden impingement of the cooling water from the spray heads tends to loosen the moulded plastic from the mould. The falling spray water is drained by tray 64 and drain 66.

Of special importance in the method is the maintenance of a flow of cooling water through the cooling tube 34 around the perimeter of the moulds. It will be noted that only the edge of the moulded product (see FIGURE 4) engages the cooling conduit 34, so that it is only this edge that is cooled by the conduit 34. This cooling prevents the edge of the moulded product from fusing to the cooling tube and assures that the edge of the moulded product is even and well defined. It does not require trimming after subsequent removal, and this is an advantage in production of articles of this type that is of considerable commercial importance because trimming is costly.

After the moulds leave the vicinity of the spray heads 58, they approach and are engaged by the article removal apparatus 72, which operates as indicated above to remove and stack the moulded product.

The drum illustrated in the drawings has a diameter of about six feet and it can conveniently be rotated during the moulding process at about one revolution per minute. The liquid level in the sump is heated to about 600° F. Such a temperature allows for the curing of plastic to the moulds through the metal of the moulds in the time that the moulds are in contact with the liquid. The contact time is about twenty seconds in the embodiment of the invention illustrated.

Polyethylene cures at about 300° F. but the 600° temperature is necessary to permit the heating of the mould and the transfer of the heat to the plastic in the contact time provided. As an aid to rapid curing it is practice to preheat the powder before it is sprayed onto the mould by the head, and this is done in the embodiment of the invention illustrated.

Modifications of the invention will be apparent to those skilled in the art. The temperature of the salt in the sump is capable of variation. The only requirement is that it be hot enough to cure the plastic in the time that the mould is in contact with the sump. Other hot liquids can be substituted for salt. If the speed of rotation of the drum is increased and all other things remain the same, the temperature of the salt would, of course, be increased. Conversely, the temperature could be decreased if the speed of rotation is lessened. Further, the point of application of the powdered plastic material to the moulds is capable of variation. It is preferred that the moulds be pre-heated by contact with the sump prior to application of the plastic, but it would be feasible to apply the plastic to the moulds before they are pre-heated. It is also preferable to spray the plastic vertically upward because in this way a more even coating of plastic powder can be achieved. However, these things are not critical to the invention. The rate of flow of the cooling water around the perimeter tubes can be varied; the only requirement here is that the flow rate be great enough, having regard to the temperature of the water, to prevent the plastic powder from curing at the perimeter portions.

The spray heads 58 in the interior upper portion of the drum are also capable of invention. The purpose of these heads is, as indicated above, to cool the hot moulds. It would be possible to cool these moulds from a position exterior of the drum.

The moulds illustrated are electroformed copper-nickel. It would be possible to make these moulds of any metal and by other processes, such as stamping or die casting, the basic requirement being that they be capable of transmitting heat from the sump to the mould.

The plastic in the embodiment illustrated is applied after having been electrostatically charged. This process is extremely useful because it permits one to achieve a moulded product of uniform thickness by making well known adjustments in the apparatus. However, the invention of this application is useful in cases where the plastic is merely powdered and applied without electrostatically charging the powder. In this latter case it would not be as easy to control the thickness of the moulded product. However, in some cases a process that did not employ electrostatically charged particles would be of value.

Modifications of the illustrated embodiment of the invention will be apparent to those skilled in the art. For example, the hot liquid sump in the drum as a means for retaining and presenting the hot liquid to the inside of the drum conveyor for the moulds could simply be replaced by an external sump for the hot liquid and a pump adapted to carry the liquid from the external sump or tank, through pipes and spray heads directed against the inside of the drum whereby to carry the liquid into heat transfer relation with the moulds. The liquid on impinging against the inside of the drum would drop to the bottom of the drum and a second pump would be provided to repump the liquid back to the storage tank. Heat would, of course, be supplied to the liquid in the storage tank by suitable means such as gas flame or electricity. The alternative, while more costly and complex, does have the advantage of easier heating of the liquid.

The liquid heat transfer medium indicated above as oil could be replaced by any suitable heat transfer medium that is liquid in the sense that it is a substance whose parts are not gaseous but which are capable of moving freely among themselves on the least pressure, and which, therefore, retains no fixed form. In this sense the heat transfer medium might consist of a volume of commercially available micro-balloons, which consist essentially of hollow glass balloons having a diameter of about 5/1000 of an inch. A volume of such micro-balloons is a liquid within the meaning of this invention and could be substituted for the oil heat transfer medium specifically described.

The mould illustrated is a cavity or deboss mould. It will be apparent that the moulding surface could be an emboss mould, in which case the moulding surface would project.

The illustrated embodiment employs a gun that electrostatically charges the solid plastic particles for deposit on the mould. This is the preferred method of applying the coating of plastic, but alternatives are possible. A layer of plastic could be applied alternatively in solid particulate form by bringing the mould into a fluidized bed of paritculate plastic material. The method of creating fluidized beds of plastic particles as a means of applying a coating of plastic is well known to those skilled in the art and need not be referred to in further detail here. In each case the plastic deposit is fused or cured by heat applied to the mould through a liquid heat transfer medium. The plastic layer could be applied in liquid form. Plastisols consisting essentially of a plastic in solution with volatile solvents and additives to give the finished product desired physical characteristics may be used. These are applied to moulds as liquid layers and cured by heat to drive off volatiles and set the solids that remain. The method of applying heat to the moulds according to this invention has application here. The method also can be used to apply layers of different plastics in the building up of a moulded article. This expedient may be important where a large body of plastic is desired, in which case the undercoatings could be of a cheap material and the surface of a preferred more costly material, provided strength requirements were met.

Other modifications will be apparent to those skilled in the art in these and other areas of the invention, and it is not intended that the foregoing description should be read in a limiting sense.

What we claim as our invention is:

1. A moulding machine comprising a drum having opposed end walls and a side wall constituted at least in part by a plurality of open moulds, said moulds having a moulding surface and a back surface opposite said moulding surface, said moulding surfaces of said moulds being on the exterior of said side wall of said drum, the interior of said drum at said mould surfaces being continuous whereby the lower part of the interior of said drum constitutes a sump for a hot liquid for all positions of rotation of said drum, means for mounting said drum for rotation with its drum axis substantially horizontal whereby in use the back surfaces of said moulds are carried in succession into contact with liquid in said sump as said drum is rotated, means for applying a coating of heat curable plastic material to the moulding surface of said moulds as said drum is rotated, said moulds being adapted to transfer heat from a liquid in said sump to plastic material in the moulding surface thereof in use, heating means for heating a liquid in said sump to cure plastic material applied to the moulding surface of said moulds by heat transfer from the liquid, through said moulds to the plastic material, cooling means for cooling said moulds being at a point on their path as said drum rotates that is subsequent to the point where they are in heat transfer relation with said liquid, and parting means for parting plastic articles from said moulds at a point on their said path that is subsequent to said cooling means.

2. In a moulding machine as claimed in claim 1, perimeter cooling means, defining the perimeter of the moulding surface of each of said moulds, said perimeter cooling means being in line heat transfer relation with the perimeter of the moulding surface of its respective mould and being adapted to continuously apply a line cooling effect to the moulding surface of the mould along the perimeter of the moulding surface only to thereby terminate curing of the plastic at the perimeter of the moulding surface to give a cured moulded product with a clearly defined edge in use.

3. In a moulding machine as claimed in claim 2, in which said perimeter cooling means comprises a conduit for coolant fluid extending around each of said moulds, said conduit being in line heat transfer relation with the perimeter of the moulding surface of its respective mould as aforesaid and means for continuously forcing a coolant through said conduit.

4. In a moulding machine a plurality of open moulds, each having a moulding surface and a back surface opposite the moulding surface, means for applying a coating of heat curable plastic material to the moulding surface of the moulds, means for applying heat to cure plastic material applied to the moulding surface of the moulds, and perimeter cooling means defining the perimeter of the moulding surface of each of said moulds in line heat transfer relation with the perimeter of the moulding surface of its respective mould for continuously applying a line cooling effect to the moulding surface of the mould along the perimeter of the moulding surface only to thereby terminate curing of the plastic at the perimeter of the moulded surface to give a cured moulded product with a clearly defined edge in use.

5. In a moulding machine as claimed in claim 4, in which said perimeter cooling means comprises a conduit for coolant fluid extending around each of said moulds, said conduit being in line heat transfer relation with the perimeter of the moulding surface of its respective mould as aforesaid, and means for continuously forcing coolant fluid through said conduit.

References Cited
UNITED STATES PATENTS

| | | | |
|---|---|---|---|
| 619,123 | 2/1899 | Beardmore et al. | 249—79 |
| 1,009,296 | 11/1911 | Franzheim | 249—79 |
| 2,046,372 | 7/1936 | Engstrom | 249—79 |
| 2,641,797 | 6/1953 | Waltman | 18—21 |
| 2,804,672 | 9/1957 | Altschuler | 25—99 |
| 3,002,230 | 10/1961 | Stewart | 18—4 |
| 3,181,202 | 5/1965 | Martelli et al. | 18—21 |
| 3,199,149 | 8/1965 | Croyle | 18—175 |
| 3,233,287 | 2/1966 | Blue et al. | 18—26 |
| 2,451,934 | 10/1948 | Evans | 264—24 |
| 3,278,656 | 10/1966 | Dicks | 264—22 |

WILLIAM J. STEPHENSON, *Primary Examiner.*

ROBERT F. WHITE, *Examiner.*

R. B. MOFFITT, *Assistant Examiner.*